United States Patent [19]

Krupnik et al.

[11] Patent Number: 5,724,711
[45] Date of Patent: Mar. 10, 1998

[54] APPARATUS FOR MAKING STEEL WOOL FILTER PADS AND RELATED METHOD

[75] Inventors: Alexander Krupnik, Northbrook; Leonid Vaysberg, Des Plaines; Mieczystow Boczek, Chicago, all of Ill.

[73] Assignee: Global Material Technologies Incorporated, Chicago, Ill.

[21] Appl. No.: 551,537

[22] Filed: Nov. 1, 1995

Related U.S. Application Data

[63] Continuation of Ser. No. 204,522, Mar. 1, 1994, abandoned.

[51] Int. Cl.⁶ .................................................. B23P 17/06
[52] U.S. Cl. ................... 29/4.52; 29/416; 29/417; 29/430; 53/143; 53/540; 53/544
[58] Field of Search .......................... 29/785, 792, 412, 29/416, 417, 4.51, 4.52, 4.53, 4.55, 17.1, 17.2, 17.3, 17.8, 163.8, 429, 430; 53/143, 540, 544

[56] References Cited

U.S. PATENT DOCUMENTS

| | | | |
|---|---|---|---|
| 2,172,767 | 9/1939 | Levine et al. | 29/4.55 |
| 2,698,260 | 12/1954 | Meauze et al. | 29/4.55 X |
| 2,829,733 | 4/1958 | Bartels et al. | 29/4.52 X |
| 2,881,516 | 4/1959 | Hull et al. | 29/417 X |
| 2,953,849 | 9/1960 | Morgan | 29/417 X |
| 3,242,562 | 3/1966 | Kraft | 29/163.8 X |
| 3,499,216 | 3/1970 | Vadim | 29/416 X |
| 4,149,649 | 4/1979 | Szego | 29/416 X |
| 4,294,005 | 10/1981 | Brennan | 29/417 X |
| 4,870,807 | 10/1989 | Palamides et al. | 53/540 X |

FOREIGN PATENT DOCUMENTS 2813635  10/1979  Germany .................... 29/430

*Primary Examiner*—Joseph M. Gorski
*Attorney, Agent, or Firm*—Laff, Whitesel Conte & Saret, Ltd.

[57] ABSTRACT

An apparatus for manufacturing multilayer steel wool filter pads includes a gantry which orbits heads about a central axis. The heads transfer portions of steel wool cut from a web onto a rotatable turntable to form a multilayer steel wool filter pad. Detection devices and a tool controller cooperate to synchronize the rotation of the turntable with the transfer of the steel wool portions to the turntable, so that each of the layers of the steel wool filter pad has its steel wool filaments oriented differently from those of the adjacent layer by an angle of approximately 90 degrees. A method for making rectangular steel wool filter pads involves advancing multiple steel wool webs through rollers, with each of the webs moving at the same rate, to form a combined web. The combined web is then cut into square portions with sides at least twice as long as the width of the rectangular steel wool filter pads. The portions are stacked so that the filaments of overlying layers are shifted 90 degrees from each other.

3 Claims, 3 Drawing Sheets

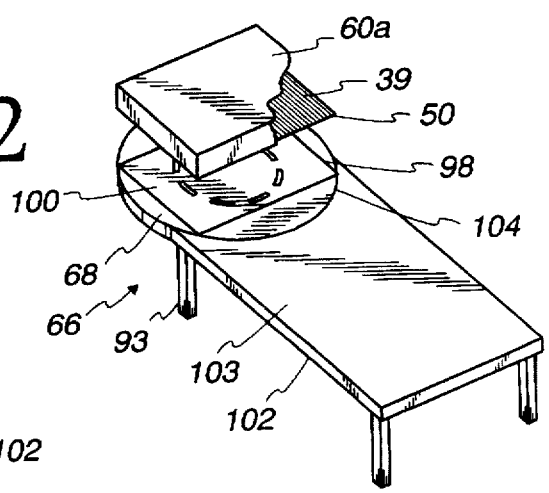
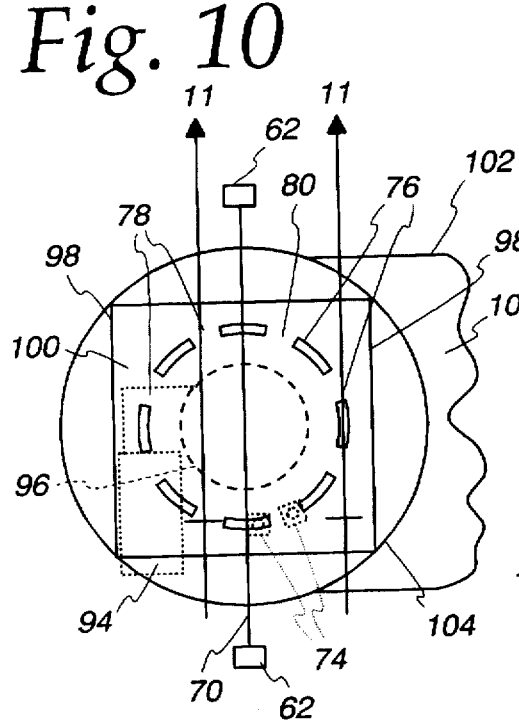
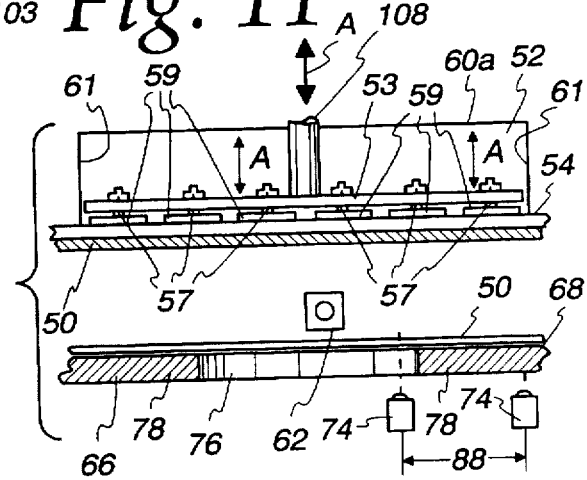
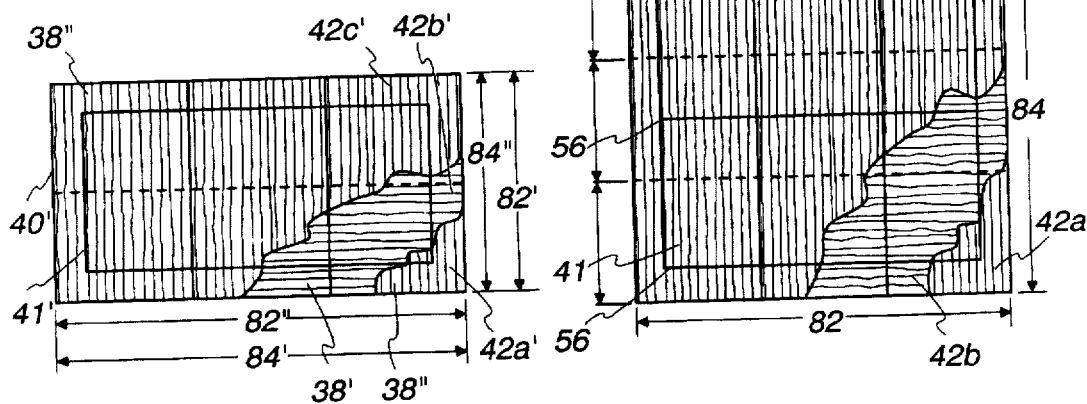
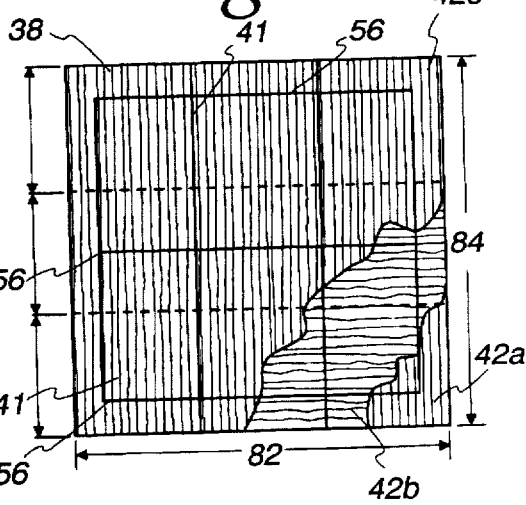

APPARATUS FOR MAKING STEEL WOOL FILTER PADS AND RELATED METHOD

This application is a continuation of application Ser. No. 08/204,522, filed Mar. 1, 1994 and now abandoned.

FIELD

This invention relates to manufacturing apparatus, and more particularly to apparatus for manufacturing multilayer, steel wool filter pads and a related method.

BACKGROUND

Automotive airbag systems often use solid pellets within steel mesh filter tubes within containment canisters which explode to deploy the airbag when required. The explosion is generally accompanied by a rapid expansion of hot gases and particles traveling with outwardly directed force to fill the airbag. Very often, the steel mesh filter tubes include more than one layer of steel mesh, with a layer of ceramic and a compressed steel wool filter pad between the multiple steel meshes. The ceramic acts to filter out particles of the solid explosive after it is activated. The steel wool filter pad, in turn, serves as a backing for the ceramic layer and keeps the ceramic from breaking down and allowing the particles to escape into the airbag through the steel mesh of the filter tubes and possibly rupturing the airbag.

The steel wool filter pads often include multiple layers. To give the filter pad internal cohesion, each layer generally includes steel wool filaments running in a direction which is shifted 90 degrees from the filaments of the adjacent, overlying layer. For example, in a three-layer filter pad, if the first layer of steel wool filaments runs north-south, the second layer will run east-west, and the third layer will run north-south.

The many steel filaments of the compressed steel wool filter pad possess a high thermal coefficient and, by being positioned between the steel meshes of the filter tube, present a large surface area to the hot escaping gases of the exploding pellet. The steel wool filter pad thus acts as a heat sink, dissipating the thermal energy of the escaping gas so that it is at a safe and optimal temperature to fill the airbag correctly. The steel filaments also create a complex path of travel for the escaping gases and thereby distribute the explosive forces evenly across the surface area of the containment canister and extinguish any flame which may accompany the gas. Thus, the steel wool filter pad enhances the safe and correct inflation of the airbag by filtering ceramic particles from the expanding gases, dissipating dangerous heat, and distributing the outward forces evenly.

The manufacturing apparatus presently used for making the steel wool filter pads suffers from numerous disadvantages and limitations. For example, the apparatus typically includes complex roller mechanisms. Multiple webs of steel wool are required to enter the multiple rollers to be pressed together at the web boundaries in order to form a steel wool filter pad of sufficient dimension for use in the airbag canisters.

Generally, the multilayer, steel wool filter pad has a rectangular shape. To produce the rectangular shape of a first layer of the steel wool filter pad, all the steel wool webs advance, are pressed together by all the rollers, and are cut to form a rectangle. The length of the rectangle thus formed is equal to the combined widths of the steel wool webs which were advanced by the rollers, and the width of the rectangle is equal to the amount of steel wool web advanced through the rollers and cut.

To form the next, overlying layer, which will be rotated 90 degrees, only a subset of the steel wool webs are advanced and cut to form another rectangle which, when rotated 90 degrees, will overlie the first layers. The width of the second rectangular layer thus formed is equal to the combined widths of the subset of steel wool webs advanced, and the length of the second rectangular layer is equal to the amount of steel web advanced through the rollers.

A third layer overlying the second layer is produced as was the first layer.

To accomplish this alternation between advancing all of the steel wool webs and some of the steel wool webs, the roller mechanism must include side-by-side rollers which not only are coaxially mounted but which also must be independently activated, depending on which of the layers of the steel wool filter pad are being created. This need to have a roller configuration for pressing together, alternately, some or all of the steel wool webs, has the further disadvantage of requiring complex sprockets and clutches in the manufacturing apparatus to activate the appropriate rollers at the appropriate times. The construction, operation, and maintenance of such manufacturing apparatus is time-consuming and costly. Finally, the steel wool webs are currently stored inefficiently in large shop containers. Advancement of the webs out of the shop containers and into the rollers requires the web to unfurl out of a box, resulting in frequent misfeeds.

After the steel wool webs are pressed together at their edges to form a web of sufficient dimension, the combined web is cut into portions. An apparatus transfers and arranges these portions into the multiple layers of the steel wool filter pad. The apparatus includes multiple heads which orbit about a central axis of a gantry to transfer the steel wool portions from where they were cut and combine them to form a stack of steel wool layers. At least one of the heads rotates about its own axis in order to stack the steel wool portions so that the direction of the steel wool filaments is shifted 90 degrees between adjacent overlying layers. For example, in an apparatus having three heads for making a three-layer steel wool filter pad, the second head is independently rotatable so as to place the middle layer of the steel wool filter pad with the filaments running in a direction shifted 90 degrees from both the bottom and top layer.

To accomplish this rotation, the rotating head is nonfixedly attached to the gantry and incorporates a mechanism, including gears and pinions, for rotating the head through the proper arc at the proper time. The complexity of the connection between the rotating head and the gantry, as well as the need for a mechanism to rotate the head, limits the speed of orbit of the gantry and the throughput of the overall apparatus which creates the multilayer steel wool filter pads.

SUMMARY

Accordingly, an object of this invention is to provide a new and improved apparatus for making multilayer steel wool filter pads free of the limitations and disadvantages described above.

Another object of this invention is to provide an apparatus which makes multilayer steel wool filter pads from continuously fed steel wool webs without needing complex roller mechanisms.

Still another object of this invention is to provide an apparatus for making multilayer steel wool filter pads more quickly and efficiently and without rotating heads.

A still further object of this invention is to provide a method for more efficiently making rectangular, multilayer steel wool filter pads from multiple steel webs.

According to the present invention, the foregoing and other objects and advantages are attained by an apparatus which includes nonrotating heads that orbit about a central axis, and a rotatable turntable operatively associated with the nonrotating heads. Each head includes a device for retrieving a portion of steel wool cut from a web and releasing the portion onto the rotatable turntable to form a layer of the steel wool filter pad. The device for retrieving and releasing the portions of steel wool includes a magnet which moves toward the steel wool portion to retrieve it and away from the steel wool portion to release it. A synchronization device rotates the turntable after each portion of steel wool is released from each head so that the steel filter pad layers stacked on the turntable have the steel filaments of adjacent layers running in directions shifted from each other. The synchronization device includes an electric eye path between the turntable and the heads and an apparatus controller operatively associated with the electric eye path. The electric eye detects the release of a steel wool portion from a head when the portion passes through the electric eye path. The apparatus controller reacts to the detection of the release of the steel wool portion by rotating the turntable.

According to another aspect of the invention, the apparatus includes sensors which indicate to the apparatus controller when the appropriate number of steel wool layers have been stacked on the turntable, at which point the apparatus controller pauses processing of the steel wool until the turntable is cleared.

In accordance with still another aspect of the invention, the turntable includes slots in the surface of the turntable through which sensing devices may detect the presence or absence of objects on the turntable. Depending on the signal from the sensing device, the apparatus controller either continues steel wool processing or pauses until the turntable is prepared to receive steel wool portions from the heads.

According to still another aspect of the invention, the apparatus includes a gantry which is connected to the heads and which rotates about the central axis of the heads. The apparatus also includes rollers into which multiple webs of steel wool are fed. The rollers advance all the steel wool webs together and press together adjacent edges of the steel wool webs to form a web of sufficient dimension for steel wool filter pads for airbag canisters.

A method of making multilayer, rectangular steel wool filter pads, according to the present invention, involves advancing multiple steel wool webs through rollers to abut adjacent edges of the webs and thereby form a combined web. The combined web is cut into square portions with sides at least twice as long as the width of the rectangular steel wool filter pads. The square portions are stacked to form a multilayer square, out of which is die-cut two rectangular steel wool filter pads.

Still other objects, advantages and novel aspects of the present invention will become apparent in the detailed description of the invention that follows, in which a preferred embodiment of the invention is shown by way of illustration of the best mode contemplated for carrying out the invention, and by reference to the attached drawings in which:

BRIEF DESCRIPTION OF DRAWINGS

FIGS. 2–8 are schematic, perspective views of a portion of the turntable of the apparatus of FIG. 1;

FIG. 10 is a top plan view of a portion of the turntable of the apparatus of FIG. 9 taken along line 10—10 of FIG. 9;

FIG. 11 is a side view of the turntable portion of FIG. 10 taken along line 11—11 of FIG. 10.

FIG. 12 is a top plan view of a steel filter pad of the prior art; and

FIG. 13 is a top plan view of a steel filter pad manufactured according to the invention.

DESCRIPTION

Figure 1:
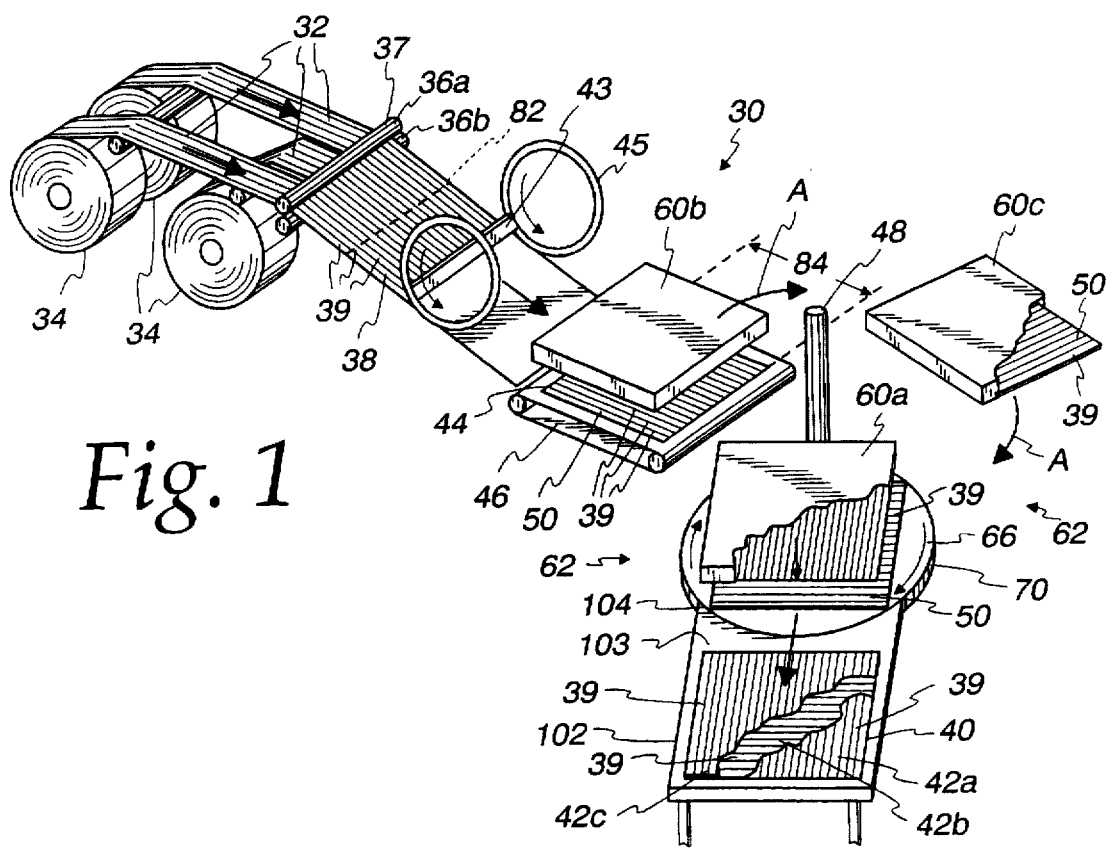
FIG. 1 is a schematic, perspective view of an illustrative embodiment of an apparatus and method according to the present invention.

As shown in FIG. 1, an apparatus 30 for making multi-layer steel wool filter pads 40, in accordance with the teachings of this invention, includes steel wool webs 32 stored in rolls 34. The steel wool webs 32 are arranged to feed side-by-side with a slight edge overlap, between a pair of rollers 36a and 36b. Each of the rollers 36a and 36b has a single, substantially cylindrical rolling surface 37 which extends uniformly across the entire length of the rollers 36a–b. The rollers 36a and 36b act to abut adjacent edges of the webs 32 together and to advance each of the webs 32 at the same rate, forming a combined steel wool web 38. Because all the webs 32 advance together at the same rate, there is no need for the rollers 36a or 36b to include side-by-side subrollers and related clutches and sprockets otherwise required to advance the webs 32 at different rates. The web 38 has a width 82. A cutting tool 45 disposed over the web 38 periodically makes a transverse cut 44 by means of a rotating blade 43 to form steel wool portions 50. The steel wool portions 50 are squares having length 84 substantially equal to the width 82 of the web 38. The square steel wool portions 50 drop to a flexible pallet 46.

The apparatus 30 includes means, here shown as orbiting heads 60a–c, for transferring the steel wool portions 50 from the pallet 46 to a turntable 66. The heads 60a–c orbit about a central axis 48 in a direction indicated by arrows A, but the heads 60a–c do not themselves rotate about their own axes independently of the orbital rotation about the central axis. As a result of this orbiting motion not accompanied by independent rotation of the heads 60a–c, the orientation of the heads 60a–c remains constant with respect to the central axis 48. Likewise, the orientation of the steel wool portions 50 and the steel wool filaments 39 remains constant with respect to the central axis 48.

Each of the heads 60a–c transfers one of the steel wool portions 50 serially to the turntable 66. The finished steel wool filter pad 40 includes three steel wool portions 50 forming steel wool layers 42a, 42b, and 42c.

FIGS. 2–8 show the turntable 66 and the heads 60a–c at various stages of making the steel wool filter pad 40. FIG. 2 shows a turntable surface 68 of the turntable 66, the turntable surface 68 being at the start of the process and therefore empty. The head 60a carries one of the steel wool portions 50 and is positioned over the turntable surface 68.

Figure 3:
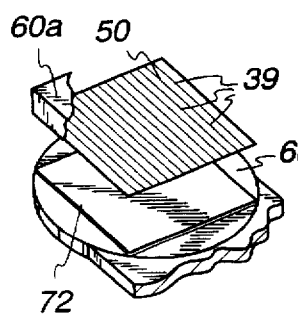
Figure 4:
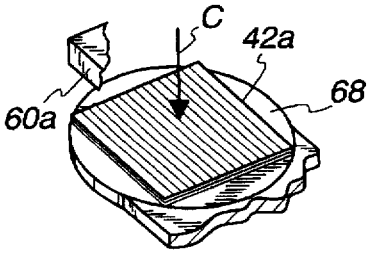

As shown in FIG. 3, a paper pallet 72 is placed on the turntable surface 68. As shown in FIG. 4, the head 60a releases the portion 50 to drop onto the pallet 72 as indicated by arrow C to form the layer 42a.

Figure 5:
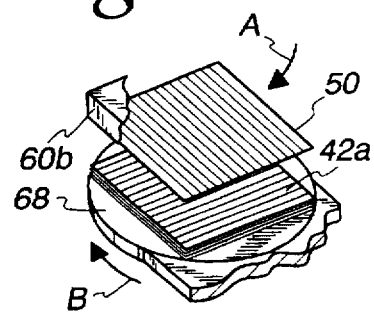

The heads 60a–c orbit in the direction indicated by arrow A of FIG. 5 so that the head 60b, carrying another of the steel wool portions 50, is located over the turntable surface 68. During this orbiting, the turntable surface 68 rotates 90 degrees as indicated by arrow B to take the position shown in FIG. 5. The head 60b releases the steel web portion 50 in the direction indicated by arrow C (FIG. 6) onto the turntable surface 68 to form the layer 42b of the steel filter pad 40. The layer 42b overlies the layer 42a, and has it steel wool fibers oriented perpendicularly to those of layer 42a.

Figure 7:
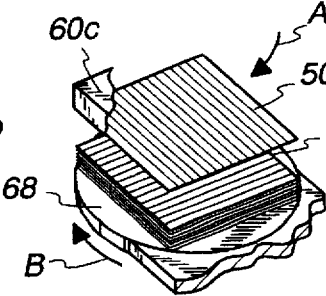
Figure 8:
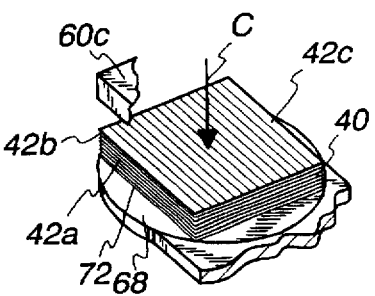

The heads 60a–c continue to orbit in the direction indicated by arrow A in FIG. 7 so that the head 60c is located over the turntable surface 68. During this orbiting, the turntable surface 68 rotates 90 degrees as indicated by arrow B to take the position shown in FIG. 7. The steel web portion 50 carried by the head 60c is dropped in the direction indicated by arrow C (FIG. 8) onto the turntable surface 68 to form the layer 42c. The layer 42c overlies the layer 42b, thus forming the completed steel wool filter pad 40.

The steel wool filter pad 40 with the layers 42a–c is shown removed from the turntable in FIG. 1. Because of the successive rotations of the turntable surface 68, the orientation of the steel wool filaments 39 of the layer 42b are shifted by an angle of about 90 degrees from the orientation of the filaments 39 of the layer 42a. Likewise, the orientation of the steel wool filaments 39 of the layer 42c are shifted by an angle of about 90 degrees from the orientation of the filaments 39 of the 42c. The steel wool filaments 39 of the layers 42a and 42c thus have the same orientation. The different orientations of the filaments 39 of the three layers 42a–c give the steel wool filter pad 40 internal cohesion required for various applications, such as in airbag canisters. The apparatus 30 formed the different orientations of the three layers 42a–c without needing any mechanisms or devices to rotate any of the heads 60a–c independently, instead relying on the more efficient expedient of rotating the turntable surface 68.

FIG. 13 illustrates the steel wool filter pad 40. The widths 82 and the lengths 84 of the layers 42a–c are substantially equal to each other and are formed by the uniform advancement and cutting of all the webs 32 (FIG. 1). The steel wool filter pad 40 shown in FIG. 13 is cut into rectangular steel wool filter pads 41 for airbag canisters by any suitable means, such as by a die cutter, by making perimeter cuts 56 of adjacent rectangles.

As seen in FIG. 12, the steel wool filter pads 40' made by prior art apparatus and methods are rectangular, and only allowed one rectangular steel wool filter pad 41' for airbag canisters to be formed from each filter pad 40'. In addition, the length indicated by 84' of the steel wool web 38' in the layer 42b' is different from the length indicated by 84" of the web 38" of the layers 42a' and 42c'. In addition, the width indicated by 82' of the steel wool web 38' used in the intermediate layer 42b' is different from the width indicated by 82" of the steel wool web 38" used in bottom and top layers 42a' and 42c'. To make the varying lengths 84', 84" and the varying widths 82', 82", the apparatus of the prior art needs multiple rollers on the same axis (not shown) and clutch and sprocket mechanisms (not shown) in order to advance the different lengths 84' and 84" and widths 82' and 82" of the webs 38' and 38".

Figure 9:
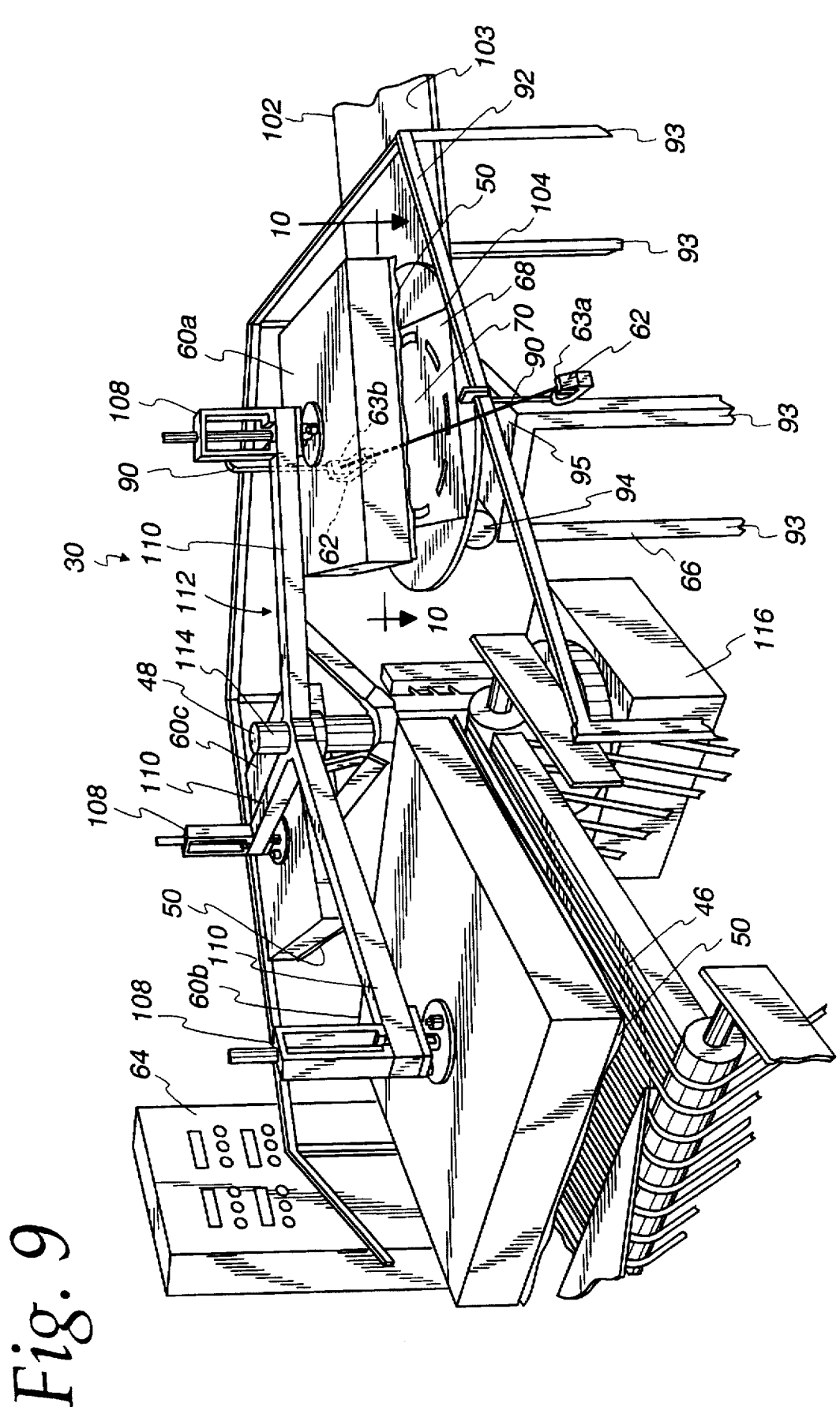
FIG. 9 is a perspective view of an apparatus according to the present invention.

Referring now to FIG. 9, further details of the apparatus 30 and its operation will be described. The apparatus 30, according to one aspect of the present invention, has means, here shown as including electric eye 62 and a programmable apparatus controller 64, for synchronizing rotation of the turntable surface 68 with the transfer of steel wool portions 50 by the heads 60a–c. The electric eye 62 consists of an emitting component 63a and a receiving component 63b, which are hung apart from each other by adjustable brackets 90 from a perimeter rail 92 surrounding the heads 60a–c. The brackets 90 are positioned so that the electric eye 62 produces a linear detection path 70 between the emitting component 63a and the receiving component 63b. The detection path extends between the turntable surface 68 and any of the heads 60a–c when they are positioned over the turntable surface 68.

Figure 6:
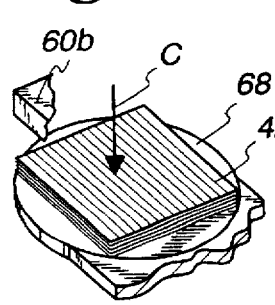

When one of the heads 60a–c is positioned over the turntable surface 68 and releases one of the steel wool portions 50, the released steel wool portion 50 interrupts the detection path 70 and forms the layer 42a on the turntable surface 68 (FIG. 4). This interruption detected by the electric eye 62 signals the apparatus processing controller 64, which acts to rotate the turntable 90 degrees and to orbit the heads 60a–c so as to position another of the heads 60a–c over the turntable surface 68 as described above in reference to FIG. 5. The detection path 70 is again interrupted when the next steel wool section 50 is released to form the layer 42b (FIG. 6). In response, the apparatus controller 64 again rotates the turntable surface 68 by 90 degrees and orbits the heads 60a–c so as to position the next head 60c over the turntable surface 68 (FIG. 7).

The apparatus controller 64 includes means to count the number of the layers 42a–c deposited on the turntable and compare the count with a particulard integer representing the number of layers desired for a selected configuration of the steel wool filter pad 40. In this embodiment, the steel wool filter pad 40 includes three layers 42a–c. Accordingly, upon release of the steel wool portion 50 which forms the layer 42c (FIG. 8), the comparing means signals the apparatus controller 64 that the number of layers 42a–c counted by the counting means equals the particulard number desired for the steel wool filter pad 40. The apparatus controller 64 responds by pausing the orbiting of the heads 60a–c and the rotation of the turntable surface 68 to allow the layers 42a–c to be removed from the turntable surface 68.

When removal of the layers 42a–c has been sensed as described immediately following, the counting means of the apparatus controller 64 is reset, and synchronized orbiting of the heads 60a–c and rotation of the turntable surface 68 continues so as to form successive steel wool filter pads 40.

As shown in FIGS. 10 and 11, the turntable 66 includes means, here shown as object sensors 74, for sensing objects on the turntable surface 68. The sensors 74 in this embodiment use an infrared beam and operate without reflectors by detecting light reflected by the objects to be detected. Suitable sensors of this type include Model No. SM2A312D Mini-Beam Sensors available from Banner Engineering, Inc., Minneapolis, Minn. When the apparatus controller 64 has paused orbiting of the heads 60a–c because all the layers 42a–c have been released to the turntable surface 68, the sensors 74 detect when the pallet 72 and the steel wool layers 42a–c have been removed from the turntable. The sensors 74 also detect when another of the paper pallets 72 has been placed onto the turntable surface 68. Upon such detection by the sensors 74, the apparatus controller 64 acts to resume orbiting the heads 60a–c to position one of the heads 60a–c over the empty pallet 72 on the turntable surface 68 to continue the series of operations discussed above with reference to FIGS. 2–8 in order to make successive steel wool filter pads 40.

The sensors 74 are mounted to the turntable 66 below the turntable surface 68 and are oriented to sense in the direction of the turntable surface 68. The turntable surface 68 has slotted arc segments 76 defined therein. The arc segments 76 are arranged with alternating nonslotted arc segments 78 to form a circular path 80 on the turntable surface 68. The sensors 74 are located under the circular path 80 and separated from each other by an arc length 88 which is greater than the length of the nonslotted arc segments 78, so that, as best seen in FIG. 11, at least one of the sensors 74 is positioned over a slotted arc segment 76 irrespective of the orientation of the turntable surface 68.

The sensors 74 are electrically connected in series. So long as all the sensors 74 detect an object proximate to them, such as the nonslotted segments 78 or the paper pallet 72, processing by the apparatus 30 continues. If any of the sensors 74 fails to detect an object proximate, such as when the paper pallet 72 is absent and one of the sensors 74 is aligned with one of the slotted segments 76, then an error condition is signalled to the apparatus controller 64, and processing is paused until an object, such as the paper pallet 72, is placed on the turntable surface 68.

As shown in FIGS. 9–11, the turntable 66 includes legs 92 extending downwardly from a mounting surface 95. A drive motor 94 is mounted on the mounting surface 95. The drive motor is operatively connected to the turntable surface 68 by a shaft 96 (FIG. 10). The turntable surface 68 is made of any suitable surface, such as, in this embodiment, stainless steel. It is important for the stainless steel of the turntable surface 68 to have a texture smooth enough to allow for easy placement and removal of the pallets 72 and coarse enough so that the pallets 72 rotate along with the turntable surface 68 when required.

The turntable surface 68 is of sufficient dimension to allow the pallets 72 and the steel wool portions 50 (FIGS. 2–8) to lie flat without overhanging the turntable surface 68. The turntable surface 68 has been scored with boundary lines 98 which form a square region 100 (FIG. 10) of approximately the same dimensions as the pallets 72 and the steel wool portions 50. The scored boundary lines 98 facilitate accurate manual placement of the pallets 72.

A transfer station 102, best shown in FIGS. 9 and 10, abuts the turntable 66. The transfer station 102 includes a horizontal surface 103 on the same horizontal plane as the turntable surface 68. The horizontal surface 103 includes an arcuate edge 104 contoured to fit flush against an arc of the turntable surface 68 without impeding rotation of the turntable surface 68. The location and configuration of the horizontal surface 103 allow the pallets 72 to be easily transferred to and from the turntable surface 68 for continued processing.

Further structural details of the heads 60a–c of the apparatus 30 are now described with particular reference to FIG. 11. The heads 60a–c retrieve and release steel portions 50 by means of magnet assemblies 52 which are moveable within the heads 60a–c. The magnet assemblies 52 will be described with reference to the head 60a shown in FIG. 11, with the understanding that the other heads 60b and 60c include the same structures. The magnet assembly 52 includes permanent magnets 59 attached to a mounting plate 53 by means of threaded bolts 57. The mounting plate 53 is of sufficient dimension to extend proximate to inner lateral surfaces 61 of the head 60a, and is thereby moveable within the head 60a. The magnets 59 are mounted in spaced relationship to each other over the surface of the mounting plate 53. The magnet assembly 52 includes a handle 108 which extends from the mounting plate 53 out of the head 60a, and which is electrically or pneumatically activated by the tool controller 64 (FIG. 9) to raise and lower the magnet assembly 52 in the directions indicated by arrows A during processing.

When the magnet assembly 52 is moved so as to be positioned against head surface 54 as shown in FIG. 11, the magnets 59 exert sufficient magnetic attractive force through the surface 54 to retain the steel wool portion 50 against the head surface 54. When the magnet assembly 52 is moved away from the head surface 54, the attractive force exerted by the magnets 59 on the steel wool portion 50 is attenuated sufficiently so that the portion 50 is released from the surface 54 onto the turntable surface 68 as indicated by the phantom lines. The surface 54 is made of any suitable nonferrous material, such as plastic.

As shown in FIG. 9, the heads 60a–c are of sufficient dimension to receive the steel wool portions 50 without their overhanging the head surface 54 (FIG. 11). The heads 60a–c are connected to radial arms 110. The arms 110 are part of a rotatable gantry 112. The radial arms 110 converge to and are attached to a central shaft 114 of the gantry 112. The central shaft 114 is selectively rotatable about the central axis 48 by a drive motor (not shown) which is housed in a gantry base 116. Rotation of the central shaft 114 causes the heads 60a–c to orbit as described previously with reference to FIG. 1. The heads 60a–c are fixedly, nonrotatably, attached to the arms 110 and hence do not rotate independently.

In an alternative embodiment of the present invention, the gantry 112 and the orbiting heads 60a–c are replaced with suitable means for transferring the steel wool portions 50 from the pallet 46 to the turntable surface 68, such as by means of moving belts or an overhead conveyor system. Another alternative embodiment of the present invention replaces the magnets 59 (FIG. 11) of the heads 60a–c with mechanical, electromagnetic, or pneumatic means for retrieving and releasing the steel wool portions 50. In still another alternative, the electric eye 62 (FIG. 9) is replaced with any suitable detecting device, such as a mechanical tripper or a laser. The number, dimension, and/or placement of the heads 60a–c about the central shaft 114 may also be varied depending on what the particular application requires. In a further variation, additional sensors may be added to the apparatus 30, such as at the moveable pallet 46 (FIG. 1) or at the webs 32, to control and "mistake-proof" operations of the apparatus 30 on the steel wool webs 32 and the portions 50.

In addition to the advantages apparent from the above description, the heads 60a–c, by being nonrotatably attached to the arms 110, are more resistant to fatigue, wear and breakdown which may occur as a result of the repeated starting and stopping of the heads 60a–c as they are orbited about the central shaft 114. Since there is no need to equip one of the heads 60a–c with a mechanism for independent rotation, the weight distribution about the central shaft 48 is distributed evenly, which reduces wear on the shaft 114 and any associated bearings (not shown). The even weight distribution and more durable attachment of the heads 60a–c allow orbiting speed to be increased, thereby increasing throughput.

A further advantage rests in the fact that the apparatus 30 needs no complex clutches or sprockets to advance the webs 32 through the rollers 36 (FIG. 1), thereby improving reliability and reducing maintenance and manufacturing costs of the apparatus 30.

While the present invention has been described with reference to a preferred embodiment thereof, illustrated in the accompanying drawings, various changes and modifications can be made by those skilled in the art without departing from the spirit and scope of the present invention; therefore, the appended claims are to be construed to cover equivalent structures.

What is claimed is:

1. A method of making steel wool pads, each of which has a length substantially exceeding its width, and each of which comprises at least two superposed layers of steel wool webbing, each said layer having steel filaments oriented in a predominant direction, the predominant direction of each layer being substantially different from the predominant direction of each other superposed layer immediately adjacent thereto, said method comprising the steps of:

continuously feeding said web providing a web of steel wool having a predominant filament orientation;

sequentially cutting from said web of steel wool a plurality of substantially square segments, whereby the predominant filament orientation of each segment is substantially the same as that of each other segment;

rotating each segment relative to its immediately successive segment;

superposing said segments after rotation thereof, thereby fabricating a substantially square stack of said segments with the predominant filament orientation of each segment being substantially different relative to the predominant filament orientation of its immediately adjacent superposed segment;

and then cutting said substantially square stack into at least two substantially rectangular pads, each having a length and width smaller than that of said substantially square stack, the length of each said rectangular pad substantially exceeding its width.

2. A method of making steel wool pads as in claim 1, wherein said providing step includes the steps of:

providing at least two continuously fed steel wool web portion;

aligning said steel wool portion adjacent each other;

and abutting adjacent edges of said steel wool portions, thereby forming said web.

3. A method of making steel wool pads as in claim 1, wherein said steps of rotating includes rotating each segment relative to its immediately successive segment without rotating said immediately successive segment.

* * * * *